United States Patent [19]

Martens

[11] Patent Number: 4,570,221
[45] Date of Patent: Feb. 11, 1986

[54] APPARATUS FOR SORTING DATA WORDS ON THE BASIS OF THE VALUES OF ASSOCIATED PARAMETERS

[75] Inventor: Theodorus G. J. A. Martens, Eindhoven, Netherlands

[73] Assignee: U.S. Philips Corporation, New York, N.Y.

[21] Appl. No.: 651,634

[22] Filed: Sep. 14, 1984

Related U.S. Application Data

[63] Continuation of Ser. No. 319,777, Nov. 9, 1981, abandoned.

[30] Foreign Application Priority Data

Nov. 12, 1980 [NL] Netherlands ......................... 8006163

[51] Int. Cl.$^4$ ........................... G06F 7/08; G06F 7/22
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,514,760 | 5/1970 | Kautz ................................. | 364/900 |
| 3,714,634 | 1/1973 | Dirks et al. ......................... | 364/900 |
| 3,764,991 | 10/1973 | Metzenthen et al. ............... | 364/900 |
| 3,794,981 | 2/1974 | O'Connor ........................... | 364/200 |
| 3,930,234 | 12/1975 | Queisser et al. .................... | 364/900 |
| 3,931,612 | 1/1976 | Stevens et al. ..................... | 364/900 |
| 4,067,058 | 1/1978 | Brandstaetter et al. ............ | 364/200 |
| 4,068,304 | 1/1978 | Beausoleil et al. ................. | 364/200 |
| 4,295,206 | 10/1981 | Cain et al. .......................... | 364/900 |
| 4,319,355 | 3/1982 | Mollier ............................... | 371/24 |
| 4,399,507 | 8/1983 | Cosgrove et al. .................. | 364/200 |

OTHER PUBLICATIONS

G. David Forney, Proceedings of the IEEE, vol. 61, No. 3, Mar. 1973, pp. 268–278.
A. J. Vinck et al., *A Class of Binary Rate One-Half Convolution Codes That Allow an Improved Stack Decoder*, IEEE Trans. on Information Theory, IT 26, (Jul. 1980) pp. 389–392.

*Primary Examiner*—Gareth D. Shaw
*Assistant Examiner*—Daniel K. Dorsey
*Attorney, Agent, or Firm*—Jack E. Haken; James J. Cannon, Jr.

[57] ABSTRACT

Apparatus for quickly sorting a succession of data words on the basis of the value of a specific parameter associated with each data word has a memory divided into M blocks of N storage locations each. A counting device includes a counter for each block, the content of each counter addressing the locations within the corresponding block. During a write operation an input data word and associated parameter are applied to an input, and the value of the parameter is used as a block address; prior to this happening the count in the counter associated with the relevant block is incremented by one. Also present is a priority determining device which, during a read operation, addresses, under the control of all counts in the counting device which indicate a number of data words other than zero in the relevant block, the block of highest priority thereamong, the locations in this block again being addressed by the corresponding counter. After the read operation, the count in the counter corresponding to the block read is decremented by one. If desired a predetermined fraction of the data words having, for example, the lowest parameter values can thus be detected.

2 Claims, 4 Drawing Figures

APPARATUS FOR SORTING DATA WORDS ON THE BASIS OF THE VALUES OF ASSOCIATED PARAMETERS

This is a continuation of application Ser. No. 319,777, filed Nov. 9, 1981 now abandoned.

BACKGROUND OF THE INVENTION

Field of the Invention

The invention relates to apparatus for quickly sorting a succession of data words on the basis of the value of a specific parameter associated with each data word.

Description of the Prior Art

In certain fields of use the word metric is associated with the parameter value. In a general sense two kinds of sorting apparatus can be distinguished. The first kind sorts a very large number of data words which concern, for example, changes to be carried out in bank accounts. These words have to be sorted, for example, according to successive account numbers (=parameters). The number of possible parameters is very large in such cases and it is impossible to execute the sorting operation in real time when the data words are supplied by an electronic feed mechanism. Extensive buffering is therefore required, the two data files ultimately being combined. This kind of apparatus therefore performs off-line batch processing of a data file.

A second kind of sorting apparatus cooperates in real time with the data input, but there is a penalty in that only a limited number of parameter values are permissible. The parameters may be, for example, measurement values from a corresponding number of measuring elements, each associated data word indicating the identity of the measuring element. The value of the parameter may alternatively represent a quality property of the data word, each data word being a possibility which is permissible à priori; the apparatus may then serve to select the best possibility from a limited number of possibilities and/or to select a number of the best possibilities in order to obtain ultimately the best choice. In this last case the problem in its most general form is to estimate the maximum a posteriori probability of the state sequence of a finite-state discrete-time Markov process observed in memoryless noise. According to the literature, this can be done by means of the Viterbi algorithm; a tutorial exposition of this has been published by G. David Forney, jr. in Proceedings of the IEEE, Vol. 61, No. 3, March 1973, pages 268-278. Applications lie in the fields of problems as regards error-correcting convolutional codes, intersymbol interference, continuous-phase frequency shift keying (FSK), and text recognition. Each data word represents a "path" in a "grid" or "trellis" according to Viterbi, said path having a starting point and an end point. A path consists of a number of segments, a partial parameter being assigned to each segment. The sum of the partial parameters of a path represents the parameter of said path, and the object is to establish the path having the lowest (or the highest) parameter. In principle, a path continues with the incoming data stream, thus its end is continuously shifted so that continuously new segments have to be taken into account. The paths continuously diverge and converge again; in the case of convergence, only the parameter of one of the converging paths is further taken into account. A particular application of the Viterbi algorithm for processing a data stream embodying an error correcting code, which application utilizes a maximum likelihood decoder, is described in: A. J. Vinck et al., "A Class of Binary Rate one-half Convolutional Codes that Allow an Improved Stack Decoder", IEEE Trans. on Information Theory, IT 26 (July 1980) p. 389 ff.

SUMMARY OF THE INVENTION

It is an object of the invention to provide apparatus for quickly sorting a succession of data words on the basis of the value of a specific parameter associated with each said data word, the internal organization of the apparatus allowing the data words to be stored, sorted according to parameter, in a simple manner, so that reading out thereof can be directly controlled in a simple manner on the basis of the sequence of the values of the parameters. The invention provides a device for the quick sorting of a first predetermined number of data words on the basis of the value of a specific metric (parameter) associated with each data word, said data words being successively applied to an input, characterized in that for M possible values of the metric and at the most N data words having the same metric value there is provided a memory which is subdivided into M blocks of at least N storage locations each, a memory control device for storing a data word received in the block addressed by the value of the associated metric, a counting device for incrementing by one unit, per data word received, a count which is updated for the block thus addressed and which acts as a write address within said block in order to indicate the number of data words in said block, a read device with a priority determining device for detecting, under the control of all counts indicating a number of data words other than zero in the relevant block, the block of highest rank thereof, and a read address generator for addressing a data word under the control of the rank number of the non-empty block of highest rank thus detected and the associated count and, moreover, for decrementing the count associated with said block by one unit.

Said memory control device may include a device for the reading of a second predetermined number of data words which is smaller than said first predetermined number of data words and for determining a metric difference, the read device stores the associated metric in an arithmetic register during the reading of the first of said data words, an output of said arithmetic register being connected to an arithmetic unit, the metric of subsequent data words being applied directly to the arithmetic unit in order to form a difference as a new metric.

In an application of an embodiment of the invention to be described hereinafter it is merely necessary to use a difference between the various parameters as a basis for deciding whether or not a stored data word should be utilized further. In this application the further utilized data words are repeatedly resorted after modifying the associated parameters in such manner that the parameters are always incremented and never decremented. In this application the reduced parameters can be used as updated parameters.

BRIEF DESCRIPTION OF THE FIGURES

Embodiments of the invention will be described in detail hereinafter, by way of example, with reference to the accompanying diagrammatic drawings in which.

DESCRIPTION OF AN APPLICATION OF THE SORTING MECHANISM FOR AN ERROR CORRECTING CODE

Figure 1:
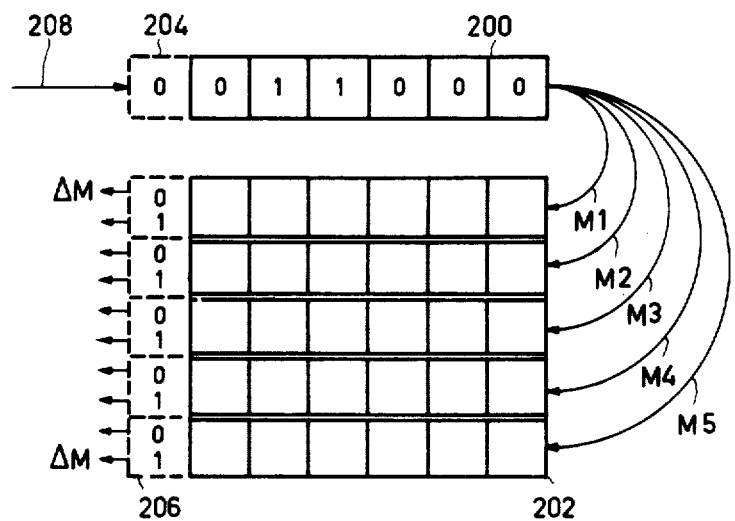
FIG. 1 illustrates a possible use of an embodiment of the invention for processing a data stream embodying an error correcting code.

FIG. 1 illustrates a possible use of an embodiment of the invention for processing a data stream embodying an error correcting code. The apparatus operates as a maximum likelihood decoder. The bits of the data stream arrive on an input 208 in order to be stored in a register 200. In this embodiment, the register has a capacity which suffices for six information units of the coded stream. Also present is a memory 202. In this embodiment, it will be assumed in first instance that this memory comprises five memory locations, each location having a capacity of six information units. The stream of bits arriving on the input 208 is redundant and has given error correcting properties. The aim is to derive from this possibly disturbed series of bits a new series of bits wherefrom the disturbances have been removed. This is realized by the formation of a number of feasible series of bits which all non disturbed, i.e. all conform to the rules of the said error-correcting code, one of this number being chosen to provide the output. The series chosen is the one for which the code distance between it and the possibly disturbed input series of bits is the smallest, it then being the case that the disturbed series has very likely been formed from the chosen non disturbed series. The "code distance" is the number of bits of a series which are different from the corresponding bits of the input bit stream. Assume that the first six information units of the series of bits received is non-disturbed. These units are stored in the memory 202. The code distance, indicated by arrow M1, then has the value zero. Subsequently, the next information unit is received on input 208. (Although this unit is shown as one bit it will in practice be constituted by the next amount of data plus the redundancy data added on the basis of said next amount of data. Thus the unit will be two successively received bits in the case of a single channel convolutional code having an efficiency of $\frac{1}{2}$. In the case of a convolutional code with three data channels and two redundant channels the unit will be five simultaneously received bits: one for each channel). This additional information unit is shown as a single bit in the block 204 which is denoted by a broken line. Each non-disturbed series stored in the memory 202 is supplemented a number of times by the same number of bits as is present in said unit, in such manner that all possibilities which result in a non-disturbed series which is permissible à priori are utilized. In the case of a systematic code and said efficiency $\frac{1}{2}$, therefore, each non-disturbed series will be supplemented once by one data bit "0" and also the corresponding parity bit, and once by one data bit "1" and also the corresponding parity bit, to give two supplemented non-disturbed series. The "0" and "1" in the column 206 indicate that the added data bit is given each of the two values. In the above single-channel and three-data-channel examples, therefore, there are $2^1 = 2$ and $2^3 = 8$ different possibilities respectively for the unit added to each non-disturbed series. Each of these possibilities involves an incremental code distance $\Delta M$ with respect to the new bits actually received. The incremental code distance is calculated in a device not shown, and a new code distance $M(1 \ldots 5) + \Delta M$ is formed for each supplemented non-disturbed series. M as well as $\Delta M$ can only be positive or zero. Therefore, if there are two possibilities for continuation of the series, the set-up shown produces at the most ten new values of the code distance. A number having the smallest distance values is chosen therefrom. This number is arbitrary per se and need not be fixed; it is limited by the physical limitations of the apparatus used (calculating time, storge capacity). If one non-disturbed series was stored in the memory 202, at least one and at the most two of the new or supplemented non-disturbed series will be chosen. If five non-disturbed series were stored in this example, at the most five supplemented series will be chosen from the ten feasible such series (because the memory can store no more than five); the smallest number which will be chosen in practice is one, but usually the number will be higher. Furthermore, the supplemented non-disturbed series exhibiting the smallest code distance from the received disturbed series is chosen. The least recently received part thereof which contains as much information as the part stored in the block 204 is output to a user. Generally, each non-disturbed series will lead via a number of splits into new non-disturbed series; however, only some thereof are saved. The correction produces an exact result if the result which was or would have previously been obtained by the reading out to the user of each supplemented series which is chosen as the "best" non-disturbed series does not exhibit a discrepancy with respect to the result which was actually obtained thus far. If the memory 202 has a capacity which corresponds to $6 + 1 = 7$ ($202 + 206$) information units per non-disturbed series as shown, then, for this to be the case, the most recent information unit but seven and all previous information units of the "new" series chosen as being the best must correspond to the previous series selected as the best non-disturbed series. After application of said information to the user, the information units of the corresponding non-disturbed series and all the other non-disturbed series chosen are stored one location further to the right, (as is the content of the register 200) each series being stored in the row which corresponds to its new code distance. The block 204 will then be available for the reception of a new information unit and the blocks 206 will be available for the formation of new continuation information units of the relevant non-disturbed series.

Although the continuation units in the block 206 have been described as being realized in this example as all possible continuation information units of the relevant non-disturbed series which conform to the relevant error-correcting code (all possible values of the continuation data bit(s) with the values of the redundancy bit(s) adapted thereto), in some cases, such as text recognition, the possible values of the continuation data bit(s) will have constraints put thereupon, so that they can be chosen only from a limited number of possibilities. These possibilities can be determined, for example, by causing each series in the memory 202 to form an address for a dictionary stored in a read-only memory.

The code distance between the non-disturbed and the disturbed series, i.e. the difference between "nominally correct text" and "possibly disturbed text" will be referred to hereinafter as the associated "parameter" of the nominally correct text.

DESCRIPTION OF A PREFERRED EMBODIMENT

Figure 2:
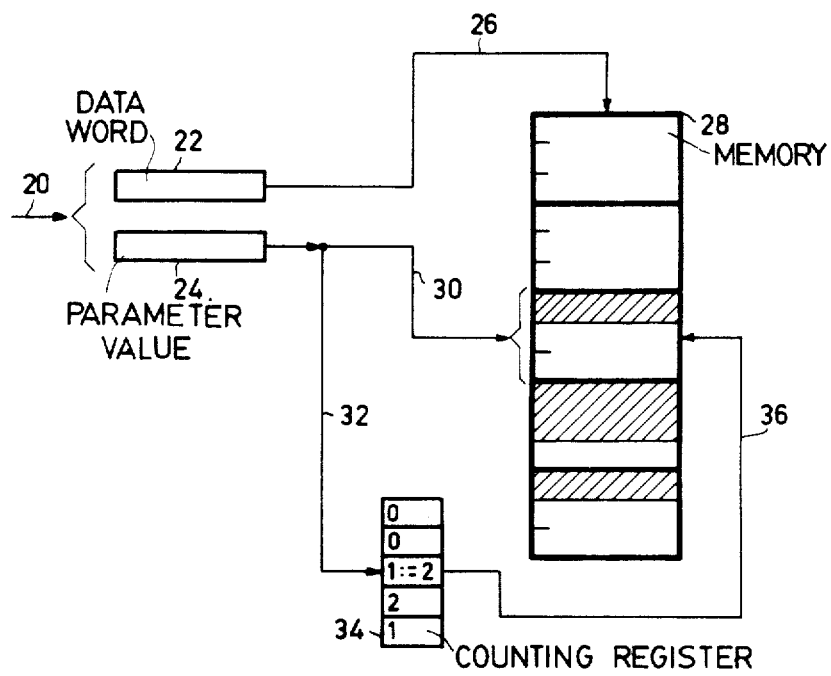
FIG. 2 illustrates the operation of an embodiment of the invention.

FIG. 2 illustrates the operation of an embodiment of the invention in the context of the process described with reference to FIG. 1, the apparatus being used to write and read data words (non-disturbed series) according to incremental parameter value. In FIG. 2, apparatus for quickly sorting the data words comprises a memory 28 which performs the function of the memory 202 of FIG. 1. As in FIG. 1, the memory 28 is divided into five blocks, each of which is enclosed by a heavy line. A data word (non-disturbed series), diagrammatically represented by a block 22, with an associated parameter value which is diagrammatically represented by a block 24, appears on input 20. Obviously, the blocks 22, 24 may be situated in a suitable register space. The content of the data word acts via line 26 as data for the memory 28. The content of the paramater acts via line 30 as an address for the memory 28 in order to address one of the five memory blocks thereof. It is assumed that each of the five memory blocks can accommodate three data words (this is a more practical version than FIG. 1, where each block was assumed to be capable of accommodating only one data word). The blocks are reserved for the values 0, 1, 2, 3 and 4 of the parameters proceeding from the top downwards. As an example the shaded blocks indicate that the memory blocks already contain 0, 0, 1, 2 and 1 data words, respectively. The next data word has, for example, the parameter 2. For each memory block there is provided a corresponding counting register in a counting register block 34, said counting register being addressed together with the memory 28 by the content of the parameter 24; the third counting register (containing a count of 1) is therefore set to a count of 2 (1:=2) and this count content 2 addresses the next empty memory location in the third memory block. The relevant data word is written therein. Upon arrival of the next data word, the procedure is repeated until the total collection of data words to be sorted has been stored in the memory 28. The memory 28 is then read in a similar manner: a value of the parameter is selected and addresses the relevant memory block; after a read operation, the count in the relevant register 34 is decremented by one unit. The memory 28 thus corresponds to the memory 202 of FIG. 1.

Assume as shown that there are only four data words involved (non-disturbed series in the description of FIG. 1), the code distances for which are 2, 3, 3 and 4, respectively. The relative code distances (with respect to the smallest, i.e. that corresponding to the "best" non-disturbed series) are therefore 0, 1, 1 and 2. Assume moreover that, for example, only the three best data words (non-disturbed series) are continued with. These three are read, and supplemented with further continuations; the incremental code distances, increased by the relevant relative code distances applicable thus far, are calculated, followed by storage in the blocks corresponding to the new code distances. The processing of the various continuations can thus be quickly performed. If an upper limit is imposed on the number of supplemented non-disturbed series to be chosen, processing can be performed within a fixed period of time. Real time operation of the apparatus is thus possible. Because each supplemented non-disturbed series (path) forms a branch of the tree structure of the various series, the position of such an upper limit results in only a reduced part of the tree being processed (reduced tree decoder).

Figure 3:
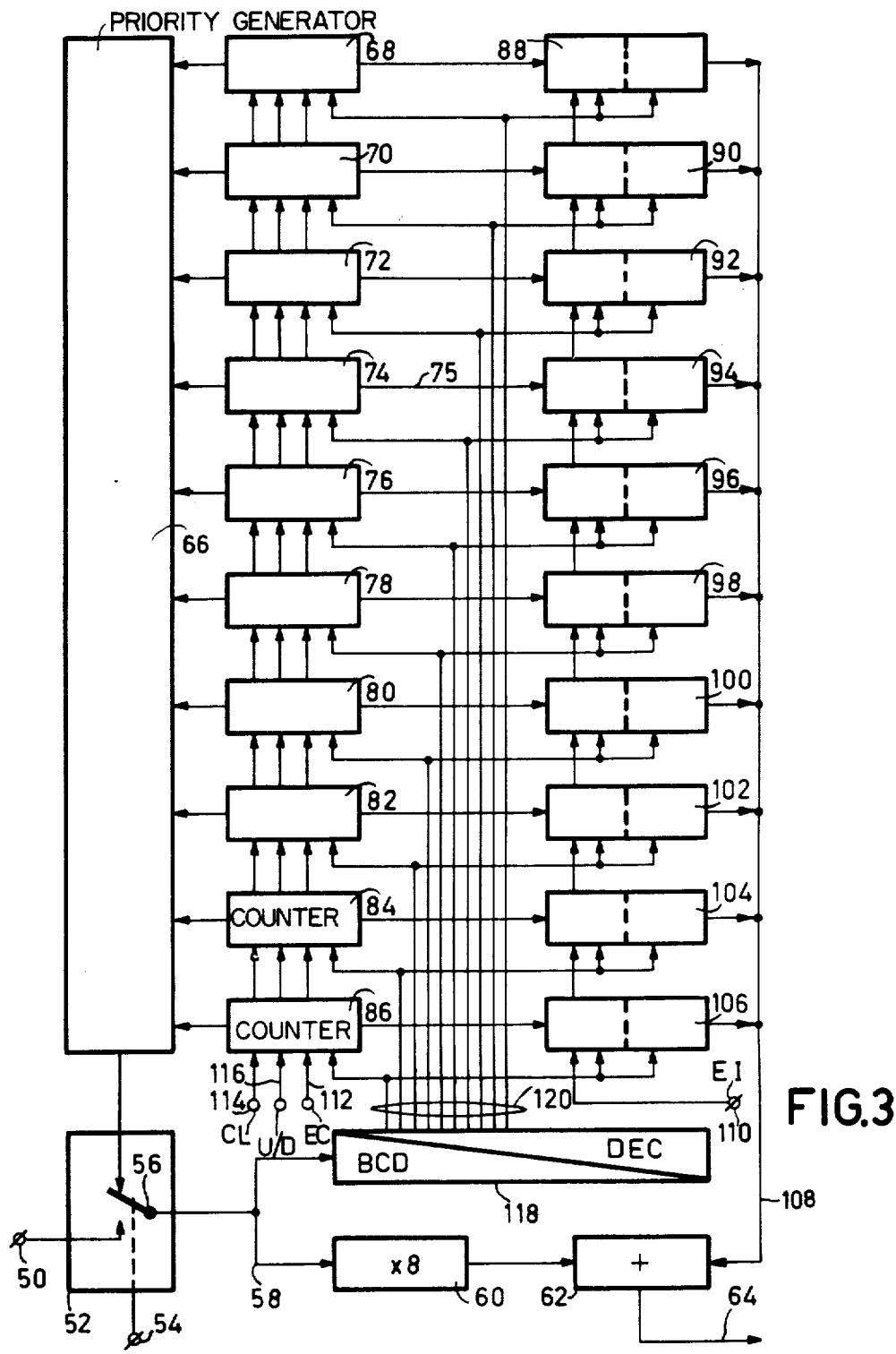
FIG. 3 is a general block diagram of the major part of an embodiment of the invention.

FIG. 3 shows a general block diagram of an embodiment of the invention in which the memory itself (28 in FIG. 2) has been omitted. 2L data words can be treated (in this example, $L=8$). M different values of the associated parameters are permissible (in this example, $M=10$). Furthermore, the largest permissible number of data words having the same value of the parameter equals N (in this example, $N=8$).

For the storage of the data words, the two-way switch 56 is set to the lower position by way of an external control signal applied to terminal 54. The binary coded parameters are applied, from input 50, to the decoder 118 which converts the binary code into a 1-out-of-10 code, so that always one line of the line bundle 120 is excited. Assume that the binary value is 0011 (decimal 3); in that case, the associated elements of the series of counters (68-86) and (multiple) data flip-flop elements (88-106) are activated; so in this case the elements 74 and 94 are concerned. A clock signal (enabling clock-EC) an input 112 and an "up" signal on up/down input 116 (U/D) now control the further counting of the counter 74 in cooperation with the selection signal on the line bundle 120. The further counting in the element 34 (FIG. 2) is thus realized. A clock signal on input 110 (EI) acts as a storage control signal for the data flipflop element 94. Multiple data flipflop element 94 has a capacity of three bits in order to completely store the counter contents received via line 75 (this counter has a range of $N=8$ counts). For the storage of the data word in the memory 28 (FIG. 2), the content of the element 94 (corresponding to the new count in the counter 74) now acts as an address within the relevant memory block; incrementing of the counter is realized before the storage (and decrementing of the counter is realized after the read operation in the read-out mode). The decoder 118 corresponds to a decoder which in fact addresses the relevant memory block of the memory 28 in FIG. 2. In the realization of FIG. 3, the data flipflop elements 88-106 have two functions, that is to say a storage function and an output function: these elements are connected to the line 108 via tri-state buffers which are activated when the corresponding flip-flop element is selected. Element 60 is a multiplier by 8. In the case of binary code input numbers, this means that it merely shifts its input number through three bit positions. In the case of BCD input numbers, the same can be realized by means of a decoder which supplies a fully binary coded number at its output. Element 62 is an adder which adds the output of multiplier 60 to the output of the flip-flop element selected from the series 88-106 and produces the ultimate memory address on line 64. Thus, element 62 can produce 80 different address values for the memory.

For the reading of the memory, there are several different procedures which may be followed; in a given case, for example, it may be advantageous to read exactly one half (L) of a number of 2L data words stored, that is to say the half having the lowest values of the parameters. In another case only a fraction or a given number of the data words will be read for a given value of the parameter, while the other data words having the same value will not be read. During the read operation, the switch 56 will be in the upper position under the control of a modified signal on input 54. The element 66 is a priority generator; this generator receives from all counters 68-86 an indication as to whether or not the relevant counter contains a count of "0". (If it does, no data words with the associated value of the parameter are stored). The relevant indication may be a single data bit. In response thereto the priority generator 66 indicates on its output the number of the counter corresponding to the lowest value of the parameter among all the counters which do not contain a count of zero, that is to say coded according to the same convention as the coding of the parameter upon artival on input 50. Therefore, this (rank) number is actually the corresponding parameter itself.

The parameter is coded to a 1-out-of-10 code in element 118, thereby selecting the corresponding counter and flip-flop element. Eventually a clock pulse, in conjunction with a "down" signal on input 11b, is applied to the counter thus selected, and the count thus decremented is stored in the relevant data flipflop element (88-106). However, prior to the decrementation thus performed, the count still stored in the relevant flip-flop element is applied to the line 108 (under the control of the selection signal on the line bundle 120 and the clock signal on the input 110) and, under the control of a clock signal not shown (if necessary), it is added in adder 62 to 8 times the value of the parameter (output of element 60) and the result is applied to the memory as a read address via line 64. Reading is terminated when a predetermined number of, for example, L data words has been read.

The counters 68-86 also have a common input 114 (diagrammatically shown) for a reset or "clear" signal (CL): when a sufficient number of data words has been read, the memory content can be invalidated by the resetting of the counters. The up/down input 116 is also common to all counters; actually the signal applied thereto is the same signal as the signal which controls the position of the switch 56 via the input 54.

Figure 4:
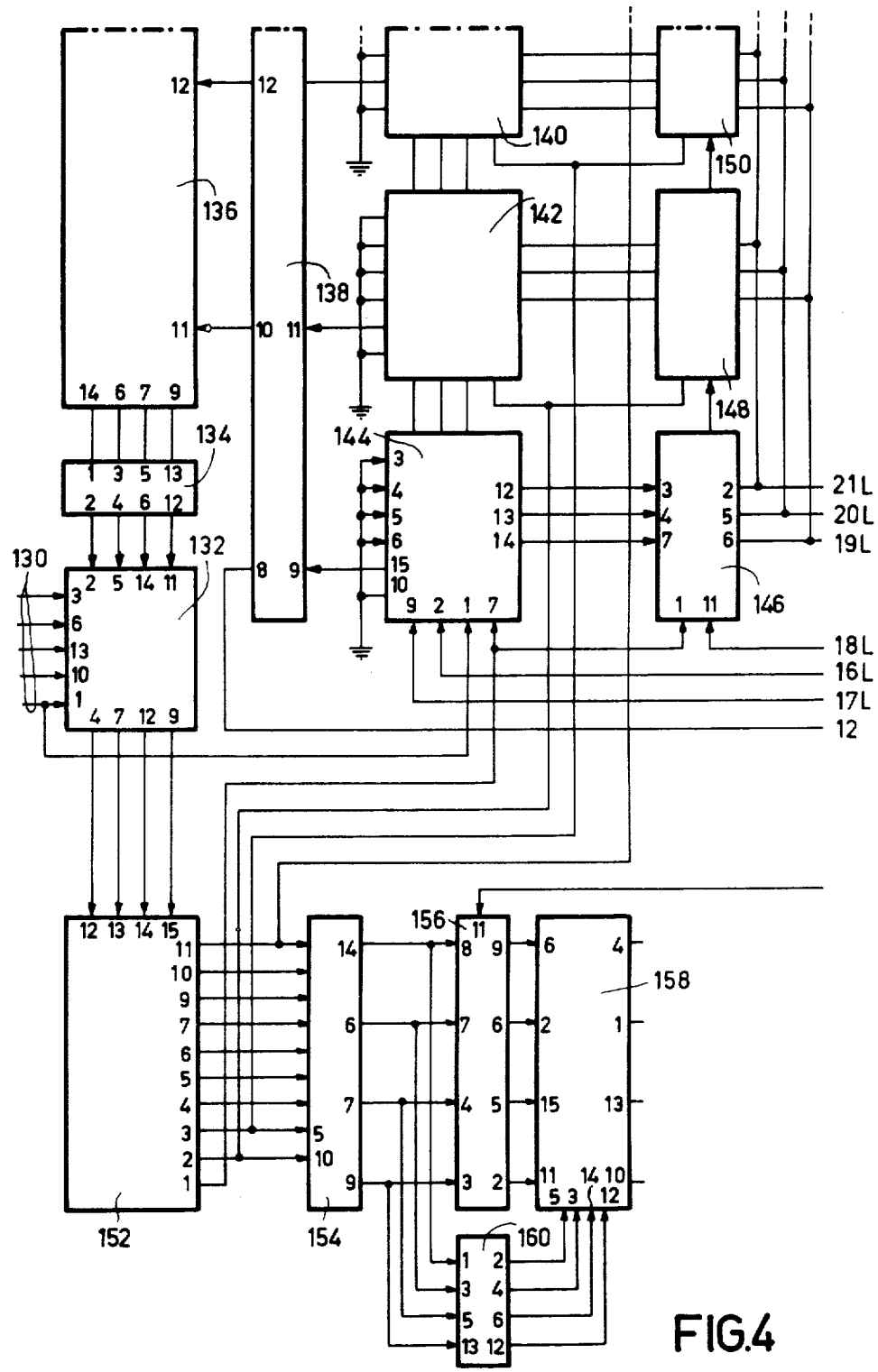
FIG. 4 shows a more detailed block diagram of the major part of the embodiment of FIG. 3.

FIG. 4 shows a more detailed block diagram of most of the embodiment of FIG. 3. The circuit is composed of the well-known series of TTL components 74 LS . . . . (LS=Low Power Schottky) manufactured by TEXAS INSTRUMENTS. Only the lower part of FIG. 3 is represented, so notably the parts shown in FIG. 3, concerning the highest parameter values. Element 132 is a component of the type 74 LS 157, which is quadruple 2-line to 1-line data selector/multiplexer. The pins 4, 7, 12, 9 form an output line. The pins 2, 5, 14, 11 form the first input line. The pins 3, 6, 13, 10 form the second input line. The pin 1 constitutes a selection control input. Element 56 of FIG. 3 is thus realized. In view of the specific properties of the further components of the circuit in this realization, element 132 receives the information (9−x) on its data inputs, x being the normal BCD representation of the parameter. The formation of this 9's-complement is realized by means of one (multiple inverter) component of the type 74 LS 04 and one (binary adder) component of the type 74 LS 283. The manner in which these components are employed is similar to that which will be described hereinafter with reference to the elements 158 and 160, which are of the same respective types.

The element 152 is a component of the type 74 LS 42. This is binary-to-decimal (1:10) decoder. The pins 12, 13, 14, 15 form the BDC input. The pins 1-7, 9-11 form the 1-out-of-10 output line. This constitutes the element 118 of FIG. 3.

The elements 140, 142, 144 are components of the type 74 LS 169. These components are synchronously operating binary up/down counters. Pin 7 is an enable input. Pin 1 is an up/down control input. Pin 2 is a clock input. Pin 9 is a load control input. The pins are connected in parallel for all elements 140, 142 . . . , as are the pins 2 and the pins 9. Pin 7 of each counter forms a selection (address) input. Pins 12, 13, 14 are counter content outputs (pin 11 is not used in this embodiment). Pins 3, 4, 5, 6 are data inputs; these inputs always receive the value "0", so that each counter can be reset to zero by a signal on pin 9. Pin 15 is the output for a carry output signal; the value thereof indicates whether or not the count in the relevant counter is zero. Pin 10 is a second enable input which is always activated due to its connection to ground.

Element 138 is a component of the type 74 LS 04. This is a 6-fold inverter. Pins 9, 11 . . . are inputs. The corresponding pins 8, 10, . . . are outputs. When the series of counters 144, 142 . . . consists of ten counters, two of these 6-fold inverters will be required. Output 8 corresponds to the memory block which has to be read last; therefore, this output need not be connected to (priority) element 136 but can be used elsewhere (output 12 of the printed wiring board on which the circuit of FIG. 4 is accommodated). This completes the description of the elements 68 to 86 of FIG. 3.

Element 136 is a component of the type 74 LS 147. This is a ten-line to four-line priority encoder. Pins 14, 6, 7, 9 serve for a four-bit BCD output signal. Pins 11, 12, 13, 1, 2, 3, 5, 10 are each intended, in this sequence, for a 1-bit input signal (so this component can receive only nine input signals to be decoded).

Element 134 is another component of the type 74 LS 04, i.e. a 6-fold inverter. Pins 1, 3, 5, 13 are inputs, and pins 2, 4, 6, 12 are the associated outputs. The element 66 of FIG. 3 is thus implemented by elements 136 and 134.

Elements 146, 148, 150 are components of the type 74 LS 374. These components are eight-fold D-type transparent latches or edge controlled flipflops provided with tri-state output buffers. Pins 3, 4, 7 are inputs for data signals. Pins 2, 5, 6 are the corresponding outputs for data signals. Pin 1 is intended for an output control input signal. Pin 11 is intended for a clock signal. The input data is taken over under the control of a positive-going clock edge, said data appearing on the output if terminal 1 is low. If the clock signal is low, the stored data remains the same (and available on the output if terminal 1 is low). If terminal 1 is high, this does not affect the data stored, but the outputs are then terminated with a high-impedance. The elements 88 to 106 of FIG. 3 are thus implemented.

Element 154 is a component of the type 74 LS 147, like the element 136. However in this case it acts as a 1-out-of-10 to BCD encoder. The specific properties of this encoder necessitate the supply of the information (9−x) to line bundle 130.

Element 160 is another component of the type 74 LS 04 (6-fold inverter).

Element 156 is a component of the type 74 LS 373; this component corresponds mainly to the type 374 already described, be it that the data storage is now effected under the control of a high signal on the enable input 11; when such a high signal is present and an output control signal input terminal (not shown) is low, the component is transparent for its data input signals. If the output control signal is low, and the input enable signal is low, the data stored remains available on the output in unmodified form. If the output control signal is high, the outputs are terminated with a high impedance.

Element 158 is a component of the type 74 LS 283. This is a 4-bit binary integer adder with fast generated carry signal. The four bits of the first operand can be received on the pins 6, 2, 15, 11. The four bits of the second operand can be received on the pins 5, 3, 14, 12. Each parameter read can thus be reduced, by way of the inversion in element 160, by a fixed value, for example the value of the parameter associated with the first data word read from the memory 28 of FIG. 2. If this is done then, for each read cycle, the lowest parameter will be reduced to zero: this is appropriate because the associated data word is the best correspondence between the (in the case of the maximum likelihood decoder) non-disturbed series and the series actually received. The absolute value of the parameter does not matter for the sorting. The combination of elements 154, 156, 158, 160 is not shown in FIG. 3, because it is actually required only for the calculation of the relative values of the parameters and in FIG. 3 its input would, therefore, be connected to the line bundle 120. The elements 60 and 62 in FIG. 3 are formed in a conventional manner. The second input 108 of element 62 is formed by the lines 19L, 20L, 21L in FIG. 4.

What is claimed is:

1. A device for storing a first predetermined number of fixed format data words on the basis of the value of a specific metric (parameter) contained in a fixed field within each data word, said metric having a predetermined known value range of M different discrete values, and any specific value of said metric occurring at most N times within said first predetermined number, said device comprising:

an input for receiving said data words in succession;

a memory comprising M memory blocks, each memory block having a plurality of at least N storage locations;

a memory control device fed by said input for controlling a write operation in said memory upon reception of a data word with the metric value operating as a memory block address on an address output connected to a first partial address input of said memory and any non-metric field as memory data on a first data output connected to a data input of said memory;

a counting device for storing an associated counting value for each block, having a second address input connected to said first data output for retrieving the counting value addressed by the metric value of data word upon reception of the data word to operate as an in-block storage location address, in that a counting value output of said counting device is connected to a second partial address input of said memory, the aggregate information on said first and second partial address inputs operating as a complete memory address, said counting device furthermore having means for incrementing and restoring the retrieved counting value upon each write operation as indicating the number of data words stored in the last-mentioned memory block;

a priority determining device fed by said counting device for receiving therefrom respective counting values to on the basis thereof determining a non-empty memory block of highest rank under control of any non-zero counting value, and outputting the associated memory block address to said first partial address input; read means having an activation input for receiving a read control signal and for thereupon generating an activation signal for said priority determining device for controlling the outputting of said last-mentioned memory block address and for controlling the outputting of the counting value associated with said last-mentioned memory block to said second partial address input, said read means having decrementing means for decrementing the counting value addressed by said priority determining means after each read access in said memory.

2. A device as claimed in claim 1, said read means comprising an arithmetic register (156) for storing upon reading of a series of data words the metric value of the first of said data words, an output of said arithmetic register being connected to an arithmetic unit (158) for therein executing upon reading subsequent data words a difference determination upon further metric values with respect to the metric value stored in said arithmetic register.

* * * * *